(12) United States Patent
Miklautschitsch et al.

(10) Patent No.: US 9,212,590 B2
(45) Date of Patent: Dec. 15, 2015

(54) INTERNAL COMBUSTION ENGINE HAVING AN EXHAUST GAS SYSTEM

(75) Inventors: Manfred Miklautschitsch, Rosenbach (AT); Samuel Bucher, Munich (DE); Stefan Babernits, Unterschleissheim (DE); Julian Becker, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 406 days.

(21) Appl. No.: 13/413,135

(22) Filed: Mar. 6, 2012

(65) Prior Publication Data

US 2012/0198842 A1 Aug. 9, 2012

Related U.S. Application Data

(63) Continuation of application No. PCT/EP2010/004745, filed on Aug. 3, 2010.

(30) Foreign Application Priority Data

Sep. 7, 2009 (DE) .......................... 10 2009 040 412

(51) Int. Cl.
*F01N 3/00* (2006.01)
*F01N 3/34* (2006.01)
(Continued)

(52) U.S. Cl.
CPC .. *F01N 3/34* (2013.01); *F01N 3/22* (2013.01); *F01N 3/30* (2013.01); *F02D 13/0207* (2013.01); *F02D 13/0261* (2013.01); *F02D 41/0255* (2013.01); *F02M 25/0752* (2013.01); *F01N 2430/10* (2013.01); *F02B 37/00* (2013.01); *F02D 41/064* (2013.01); *F02D 41/402* (2013.01); *Y02T 10/18* (2013.01); *Y02T 10/26* (2013.01); *Y10T 29/49231* (2015.01)

(58) Field of Classification Search
USPC ............................................. 60/606, 273–324
See application file for complete search history.

(56) References Cited

U.S. PATENT DOCUMENTS

| | | | | |
|---|---|---|---|---|
| 4,674,283 A | * | 6/1987 | Ishida et al. | .................... 60/606 |
| 5,357,749 A | | 10/1994 | Ohsuga et al. | |
| 6,691,506 B2 | * | 2/2004 | Shimizu | .......................... 60/284 |
| 7,263,824 B2 | * | 9/2007 | Bellinger et al. | ............... 60/288 |

(Continued)

FOREIGN PATENT DOCUMENTS

| | | | |
|---|---|---|---|
| EP | 1 367 256 A1 | | 12/2003 |
| JP | 61205317 A | * | 9/1986 |

OTHER PUBLICATIONS

International Search Report dated Nov. 8, 2010 with English translation (four (4) pages).

*Primary Examiner* — Anthony Ayala Delgado
(74) *Attorney, Agent, or Firm* — Crowell & Moring LLP

(57) ABSTRACT

An internal combustion engine has at least one combustion chamber and an exhaust gas system arranged on an exhaust gas outlet port. The exhaust gas system includes at least one secondary air injection device for injecting secondary air into the exhaust system between the combustion chamber and an exhaust emission control system arranged in the exhaust gas system. During operation of the internal combustion engine, a residual gas content in the combustion chamber can be changed. The secondary air injection site on the exhaust gas system is arranged so far from the combustion chamber that injected secondary air flows back into the exhaust gas outlet port due to back-flowing exhaust gas in the exhaust gas system but does not flow back into the combustion chamber. This makes it possible to comply with SULEV emission limits even for engines having many combustion chambers and/or exhaust gas turbochargers.

3 Claims, 1 Drawing Sheet

(51) Int. Cl.
*F01N 3/22* (2006.01)
*F01N 3/30* (2006.01)
*F02D 13/02* (2006.01)
*F02D 41/02* (2006.01)
*F02M 25/07* (2006.01)
*F02B 37/00* (2006.01)
*F02D 41/06* (2006.01)
*F02D 41/40* (2006.01)

(56) References Cited

U.S. PATENT DOCUMENTS

2003/0121484 A1\* 7/2003 Wang ............... 123/90.16
2003/0213454 A1  11/2003 Grieser et al.
2006/0283172 A1\* 12/2006 Leone et al. ............ 60/274
2007/0056266 A1\* 3/2007 Kurtz ................. 60/279
2007/0084197 A1  4/2007 Murase et al.

\* cited by examiner

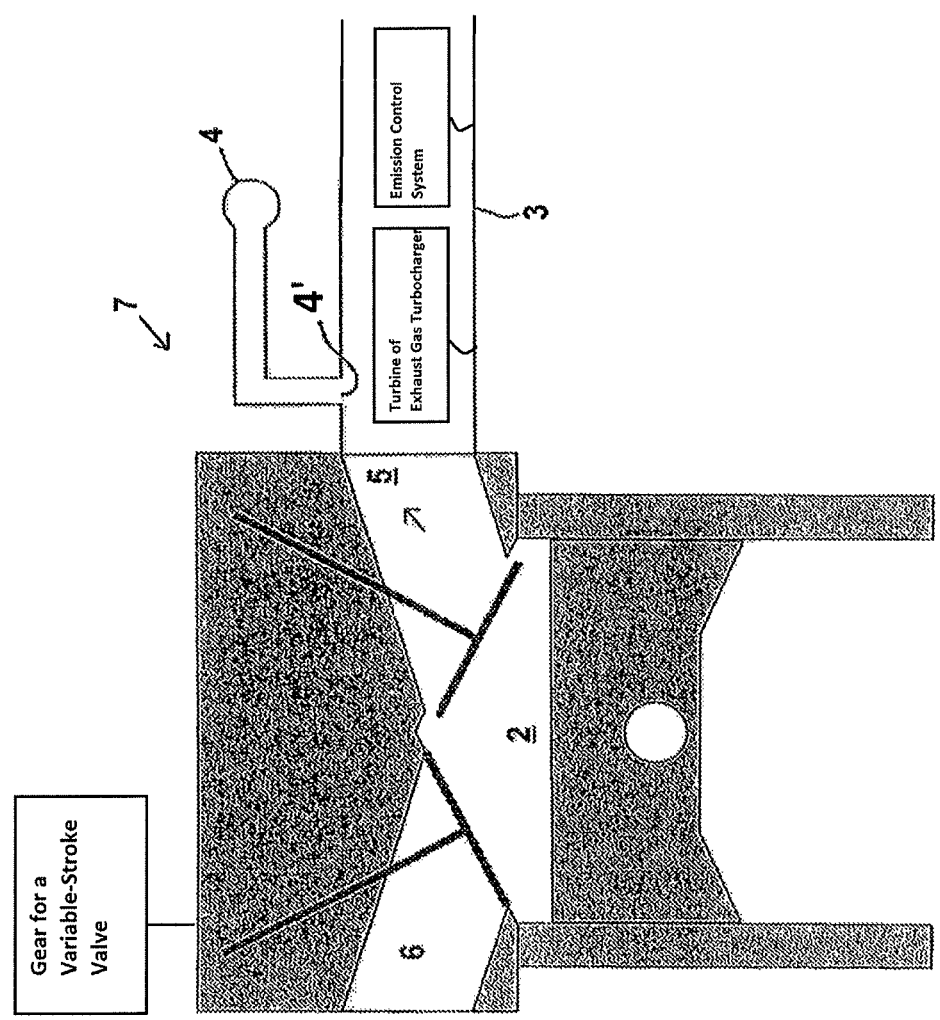

INTERNAL COMBUSTION ENGINE HAVING AN EXHAUST GAS SYSTEM

CROSS-REFERENCE TO RELATED APPLICATIONS

This application is a continuation of PCT International Application No. PCT/EP2010/004745, filed Aug. 3, 2010, which claims priority under 35 U.S.C. §119 from German Patent Application No. DE 10 2009 040 412.0, filed Sep. 7, 2009, the entire disclosures of which are herein expressly incorporated by reference.

BACKGROUND AND SUMMARY OF THE INVENTION

The invention relates to an internal-combustion engine having an exhaust gas system that is arranged at an exhaust gas outlet port and has at least one secondary air injection device for injecting secondary air into the exhaust system between the combustion chamber and an emission control system arranged in the exhaust system.

In "Wikipedia", the free encyclopedia, a secondary air injection system, for example, is described as follows: In the case of Otto engines, the secondary air injection system is used for complying with legal emission standards and laws. It consists essentially of the secondary air pump and the secondary air valve. In the cold starting phase, the system is used for oxidizing the exhaust gas constituents HC (hydrocarbons) and CO (carbon monoxide). In addition, it very rapidly heats the catalytic converter to the operating temperature. By way of the lambda probes, the engine control unit recognizes the beginning effect of the catalytic converter and subsequently switches off the secondary air pump. A secondary air injection system is becoming increasingly important in order to be able to comply with increasingly stricter exhaust gas standards and laws.

1. Mode of Operation:

As a result of the injection of secondary air, HC- and CO-pollutants are reduced in the cold-start period and in the warm-up period of the engine ($\lambda \leq 1$, rich fuel/air mixture) by means of thermal afterburning. In these engine operating states, the controlled three-way catalytic converter will not yet be fully operable.

2. General State of the Art:

A secondary air injection (SA injection) is used for obtaining, for example, the SULEV (Super Ultra Low Emissions Vehicle) exhaust gas certification of the State of California and for observing other very strict exhaust gas limit values for Otto engines. In this case, immediately after the cold start, ambient air is introduced by way of a secondary air pump (SA pump) for a certain time into the hot exhaust gas flow of the internal-combustion engine in order to initiate subsequent reactions, as indicated above. These subsequent reactions cause the oxidation of products of partial combustion (HC, CO), which, on the one hand, results in a reduction of the HC- and CO emissions and, on the other hand, by way of the heat of this subsequent reaction, in a rapid reaching of the conversion temperature of the catalytic converter (so-called catalytic-converter heating). This secondary air injection usually takes place, as close to the exhaust valves as possible, into the exhaust gas outlet ports within the cylinder head in order to further the initiation of the subsequent reactions as a result of the high exhaust gas temperatures at the injection site. During the catalytic-converter heating, the ignition angle is usually set to late (i.e., ignition after the ignition dead center (top dead center) of the piston) in order to intentionally reach a low efficiency of the internal-combustion engine but reach particularly high exhaust gas temperatures. If a camshaft adjustment is possible, the position of the camshaft(s) during the secondary air injection is derived from the requirements of the internal-combustion engine start and the later transition to the starting movement, so that, at most, moderate overlaps of the intake and exhaust valves will occur, resulting in low residual gas contents in the combustion chamber of the internal-combustion engine. The internal-combustion engine operation with the secondary air injection and the late ignition angle will be terminated when certain limits are exceeded, for example, of the time since the start of the internal-combustion engine, the temperature of the catalytic converter and/or the internal-combustion engine, and/or of the vehicle speed.

One disadvantage of this technique is, for example, the one-sided optimization of the HC/CO emissions before the catalytic converter light-off without taking into account the conceivable additional advantageous potentials with respect to the exhaust gas temperature and the NOx emissions. Particularly in the case of internal-combustion engines having an exhaust gas turbocharger (ATL), a very high exhaust gas enthalpy flow is required for reaching the SULEV limit values in order to rapidly heat the catalytic converter because the turbine of the exhaust gas turbocharger acts as a heat sink and has to be compensated.

For providing this exhaust gas enthalpy flow, the internal-combustion engine has to be operated at a very late ignition angle for achieving very high exhaust gas temperatures, which, in turn, requires a high cylinder charge with an inlet gas/fuel mixture for overcoming the internal friction of the cold internal-combustion engine and for supplying consuming devices, such as an air-conditioning compressor or a power steering pump. Under these operating conditions, a considerable formation of nitrogen oxides ($NO_x$) will occur even with an oxygen deficiency in the cylinder (combustion chamber), which nitrogen oxides ($NO_x$) may, for example, slightly exceed the SULEV limit values.

It is an object of the present invention to avoid the above-described disadvantages.

This and other objects are achieved by an internal-combustion engine having at least one combustion chamber and having an exhaust system that is arranged at an exhaust gas outlet port and has at least one secondary air injection device for injecting secondary air into the exhaust system between the combustion chamber and an emission control system arranged in the exhaust system. A residual gas content in the combustion chamber is changeable during operation of the internal-combustion engine and, at the exhaust system, the secondary air injection site is located sufficiently far from the combustion chamber that injected secondary air, as a result of back-flowing exhaust gas in the exhaust system, flows back into the exhaust gas outlet port but specifically not back into the combustion chamber.

By means of the further development according to the invention, it becomes possible to observe, for example, the SULEV emission limit values also in the case of internal-combustion engines having many combustion chambers and/or exhaust gas turbochargers, where a SULEV certification has previously not seemed possible. In a further advantageous fashion, the precious metal charging of the catalytic converter can be reduced without endangering the emissions certification in the case of previous SULEV engines, which leads to a clear cost reduction. In addition, the cell density of the catalytic converter can be reduced without endangering the emissions certification, which results in a lower flow resistance and therefore in a lower exhaust back pressure. This leads to achieving higher power and torque values and/or to the elimination of previously required compensation measures for achieving performance equality between standard and SULEV variants of an internal-combustion engine. Furthermore, the secondary air injection site is advantageously transferred out of the cylinder head, whereby identical parts can be used for standard and SULEV variants of an internal-combustion engine. The transfer of the secondary air injection site out of the cylinder further promotes the cooling and stability of the cylinder head in the case of a SULEV design. This results in an increase of the full-load capability and the service life of the cylinder head and the internal-combustion engine respectively.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a sectional view of an exemplary cylinder head of a SULEV internal-combustion engine with a section of the exhaust system.

DETAILED DESCRIPTION OF THE DRAWING

FIG. 1 is a sectional view of a cylinder head of an internal-combustion engine 1 with a section of an exhaust system 3, by which it is possible to comply with SULEV limit values. A combustion chamber 2 of a cylinder is arranged in the cylinder head of the internal-combustion engine 1. During operation of the internal-combustion engine 1, the exhaust gases flow out of the combustion chamber 2 into an exhaust gas outlet port 5 in the cylinder head of the internal-combustion engine 1. A flow direction of the exhaust gas is symbolically illustrated by an arrow. The exhaust gas further flows into the exhaust system 3 at which a secondary air injection device 4 is arranged. By means of this secondary air injection device 4, inlet air (secondary air) can be injected into the exhaust line 3 at a secondary air injection site 4' in order to initiate a thermal afterburning of CO and HC.

According to an aspect of the invention, a residual gas content in the combustion chamber 2 can be changed during the operation of the internal-combustion engine 1 and, at the exhaust system 3, the secondary air injection site 4' is located far enough away from the combustion chamber 2 that injected secondary air, as a result of back-flowing exhaust gases (caused by the charge cycle) in the exhaust system 3, flows back into the exhaust gas outlet port 5 but specifically not back into the combustion chamber 2.

In a further aspect of the invention, a turbine of an exhaust gas turbocharger, which is not shown in FIG. 1, in the flow direction of the exhaust gas, is arranged behind the secondary air injection site 4' and in front of the emission control system 5 in the exhaust system 3. The residual gas content in the combustion chamber 2 can, for example, be achieved by way of a variable-stroke valve gear, which is also not shown in FIG. 1, and/or by way of an intake and/or outlet spread of the intake and/or outlet camshaft, which is also not shown in FIG. 1. These measures are generally known to a person skilled in the art and will be briefly outlined in the following.

EXPLANATION OF THE INVENTION

The demands with respect to the high exhaust gas enthalpy flow, on the one hand, and low $NO_x$ emissions before the catalytic converter phase, on the other hand, can be met simultaneously when a high residual gas or exhaust gas content is present in the combustion chamber. In the case of internal-combustion engines 1 with camshaft timing devices and a variable intake valve stroke, as, for example, in the case of the BMW Valvetronic, this can be achieved, for example, in that the intake as well as the outlet camshafts are set to late and a small intake valve stroke is selected. In the case of internal-combustion engines 1 with camshaft timing devices but without a variable intake valve stroke, this can be achieved in that a large charge cycle valve overlap is set. In the case of internal-combustion engines 1 which have only an intake camshaft timing device, the residual gas content can be maximized by way of an advance position of the intake camshaft. The thus reached high residual gas contents in the combustion chamber 2, cause, as a result of the lowering of the peak temperatures of the combustion, an extensive suppression of the $NO_x$ formation and, as a result of the slower combustion, a very late position of the conversion center with respect to the piston position, and again considerably higher exhaust gas temperatures, while the HC emissions before the catalytic converter light-off are simultaneously lower than can be reached by a late ignition angle alone. For complying with the SULEV limit values with respect to HC, however, a secondary air injection will nevertheless be required in the case of most internal-combustion engine concepts.

The desired high residual gas contents in the combustion chamber 2 are, among other factors, significantly influenced by the backflow of exhaust gas from the exhaust gas outlet port 5 into the combustion chamber 2. This backflow can be caused by the downward movement of a piston when the charge cycle outlet valve is open and the charge cycle intake valve is simultaneously closed or by the pressure difference between the exhaust gas outlet port 5 and the inlet air port 6 while the charge cycle intake and charge cycle outlet valves are simultaneously open, in the proximity of the charge cycle top dead center of the piston. However, as known from the prior art, when secondary air is injected into the exhaust gas outlet ports 5 in the cylinder head, instead of the desired exhaust gas, mainly secondary air will now arrive in the combustion chamber 2. As a result, the described advantages of a high residual gas content in the combustion chamber 2 cannot be utilized. In addition, there is a "wasting" of secondary air because the latter is already participating in the combustion in the combustion chamber and is no longer available for subsequent reactions in the exhaust system. For the implementation of the potentials of the combustion with a high residual gas content, it is therefore absolutely necessary that the secondary air injection does not take place close to the outlet valve but so far downstream that, at the selected charge cycle valve control timing and camshaft adjustments, the injected secondary air specifically does not flow back into the combustion chamber 2. Accordingly, this results in a secondary air injection site 4' which is farther away from the charge cycle outlet valves and is therefore situated, for example, in the exhaust gas manifold, the cylinder-head-side exhaust gas manifold flange or in an intermediate flange to be inserted between the cylinder head and the exhaust gas manifold flange.

The high residual gas contents are therefore usually well tolerated particularly by supercharged internal-combustion engines 1 because of the high charging movement required anyhow for the full load, without excessively reducing the smooth running of the internal-combustion engine 1. Furthermore, the "rich" fuel/air composition in the combustion chamber 2 (oxygen deficiency) typical of a secondary air injection also has a combustion-stabilizing effect. In addition, in the case of internal-combustion engines 1 with a fuel injection directly into the combustion chamber 2, the fuel injection can also be optimized, for example, by using a multiple injection, such that at high residual gas contents, the variance (extent of variations) of the combustion remains acceptable.

Since the geometry of exhaust systems, combustion chamber heads, etc. varies considerably from one internal-combustion engine to the next, no precise measurements can be indicated for the present invention as to how far the secondary air injection site 4' has to be away from the outlet charge cycle valves; however, in general a value of approximately 90 mm or more was found to be acceptable.

TABLE OF REFERENCE NUMBERS

1 Internal-combustion engine
2 Combustion chamber
3 Exhaust system
4 Secondary air injection device
4' Secondary air injection site
5 Exhaust gas outlet port
6 Inlet port The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating an internal-combustion engine having at least one combustion chamber with an exhaust gas outlet port and an exhaust system arranged on the exhaust gas outlet port, a secondary air injection site configured to inject secondary air into the exhaust system between the at least one combustion chamber and a downstream emission control system, the method of operating the internal-combustion engine comprising the acts of:

changing a residual gas content in the at least one combustion chamber during operation of the internal-combustion engine;

injecting the secondary air into the exhaust system at the secondary air injection site; and drawing the injected secondary air back into the exhaust gas outlet port but not back into the at least one combustion chamber.

2. The method according to claim 1, further comprising: a gear for a variable-stroke valve that is configured to change the residual gas content.

3. The method according to claim 1, further comprising: an adjustable intake and/or outlet camshaft that is configured to change the residual gas content.

* * * * *